(12) United States Patent
Chau et al.

(10) Patent No.: US 9,348,480 B1
(45) Date of Patent: May 24, 2016

(54) PROVIDING USER-DEFINED PARAMETERS TO AN ACTIVITY ASSISTANT

(75) Inventors: Stephen Chau, Palo Alto, CA (US);
Andrew T. Szybalski, San Francisco, CA (US); Stephane Lafon, Sunnyvale, CA (US); Andrea Lynn Frome, Berkeley, CA (US); Jerry Howard Morrison, Mountain View, CA (US); Derek Prothro, San Mateo, CA (US); Huy Nguyen, San Jose, CA (US); Kansinee Adsanatham, San Francisco, CA (US); Dennis Moak Hwang, San Francisco, CA (US)

(73) Assignee: Google Inc., Mountain View, CA (US)

( * ) Notice: Subject to any disclaimer, the term of this patent is extended or adjusted under 35 U.S.C. 154(b) by 947 days.

(21) Appl. No.: 13/334,001

(22) Filed: Dec. 21, 2011

Related U.S. Application Data

(60) Provisional application No. 61/425,716, filed on Dec. 21, 2010.

(51) Int. Cl.
*G06F 3/048* (2013.01)
*G02B 21/00* (2006.01)
*G01J 3/02* (2006.01)
*G06F 3/041* (2006.01)

(52) U.S. Cl.
CPC . *G06F 3/048* (2013.01); *G01J 3/02* (2013.01); *G02B 21/002* (2013.01); *G06F 3/041* (2013.01)

(58) Field of Classification Search
CPC ..... G06F 3/048; G06F 3/0482; G06F 3/0484; G06F 3/041
USPC .......................... 715/747, 764, 830, 810, 825
See application file for complete search history.

(56) References Cited

U.S. PATENT DOCUMENTS

| | | | |
|---|---|---|---|
| 2007/0219842 A1 * | 9/2007 | Bansal et al. | 705/9 |
| 2009/0033633 A1 * | 2/2009 | Newman et al. | 345/173 |
| 2011/0096006 A1 * | 4/2011 | Jeong et al. | 345/173 |
| 2011/0185283 A1 * | 7/2011 | Jun et al. | 715/745 |

* cited by examiner

*Primary Examiner* — Ajay Bhatia
*Assistant Examiner* — Phuong Nguyen
(74) *Attorney, Agent, or Firm* — McDermott Will & Emery LLP

(57) ABSTRACT

Disclosed herein is an "activity assistant" and an "activity assistant user interface" that provides users with dynamically-selected "activities" that are intelligently tailored to the user's world. For example, a graphical UI includes selectable context elements, each of which corresponds to a user-attribute whose value provides a signal to the activity assistant. In response to selecting a parameter associated with at least one of the selectable context elements, a first signal is generated and provided to the activity assistant. In response to providing the signal, one or more activities are populated and ordered based, at least in part, on the signal, and subsequently displayed. The parameters may include a current mood of a user, a current location of the user, associations with other users, and a time during which the user desires to carry out the activity in some examples.

19 Claims, 8 Drawing Sheets

PROVIDING USER-DEFINED PARAMETERS TO AN ACTIVITY ASSISTANT

CROSS-REFERENCE TO RELATED APPLICATIONS

The present application claims the benefit of priority under 35 U.S.C. §119 from U.S. Provisional Patent Application Ser. No. 61/425,716 entitled "AN ACTIVITY ASSISTANT USER INTERFACE FOR PROVIDING USER-DEFINED PARAMETERS TO AN ACTIVITY ASSISTANT USING SCROLLABLE WHEEL-LIKE SELECTION ELEMENTS," filed on Dec. 21, 2010, the disclosure of which is hereby incorporated by reference in its entirety for all purposes.

BACKGROUND

Unless otherwise indicated herein, the materials described in this section are not admitted to be prior art by inclusion in this section.

Various technologies can be utilized to electronically exchange information between users. For example, computers, telephones, and personal digital assistants (PDAs) can be used to exchange content over communication networks including the Internet. The content exchanged between such devices can include web pages that, in turn, can include text, video data, audio data and/or other types of data.

SUMMARY

Disclosed herein are methods and systems that relate to an "activity assistant" that provides users with dynamically-selected "activities" that are intelligently tailored to the user's world. Accordingly, an example activity assistant may customize display of a user's activity list, suggest activities, and customize activity search results based on personalized factors such as the user's interests, current mood, and intent. Furthermore, an example activity assistant may also be capable of intelligently varying the behavior of a given activity from one user to another, depending upon the characteristics of a given user. For example, the activity assistant may score an activity based not only on the characteristics of the activity itself, but also based on data that is indicative of the user's "context" (e.g., the user's, interests, intents, moods, location, time frames, experiences, etc.).

According to an example embodiment, one or more user interfaces may also be provided that allow for intuitive user interaction with activities via the activity assistant. These user interfaces may each be generally referred to herein as an "activity assistant user interface". A user typically accesses the activity assistant UI by logging in to a user's activity-assistant account. According to an example embodiment, the activity assistant UI displays graphical and textual representations of activities to a user in a logical manner that varies according to interests, intents, moods, location, time frames, experiences, etc. of the user. Via the activity assistant UI, the user may view activities they have added to a personal "activity list," view suggested activities, create and add new activities to their activity list, and/or add/delete existing activities (e.g. those created by other users) to/from their activity list, among other functions.

In one aspect, an example method of interfacing with an activity assistant may include providing a graphical user interface comprising a plurality of selectable context elements, each of which corresponds to a user-attribute whose value provides a signal to the activity assistant, selecting a parameter associated with at least one of the selectable context elements comprising a first user-attribute, generating in response to receiving the parameter, a first signal and providing the signal to the activity assistant, in response to providing the signal, receiving a plurality of activities populated and ordered based, at least in part, on the signal, and displaying the plurality of activities ordered based at least in part on the signal. The parameter may comprise at least one of a current mood of a user, a current location of the user, an identification of someone with whom the user would like to participate in the activity with, and a time during which the user desires to carry out the activity. Furthermore, the method may include selecting at least three parameters, selected from the current mood of the user, the current location of the user, someone with whom the user would like to participate in an activity with, and the time during which the user desires to carry out the activity.

DETAILED DESCRIPTION

Figure 1:
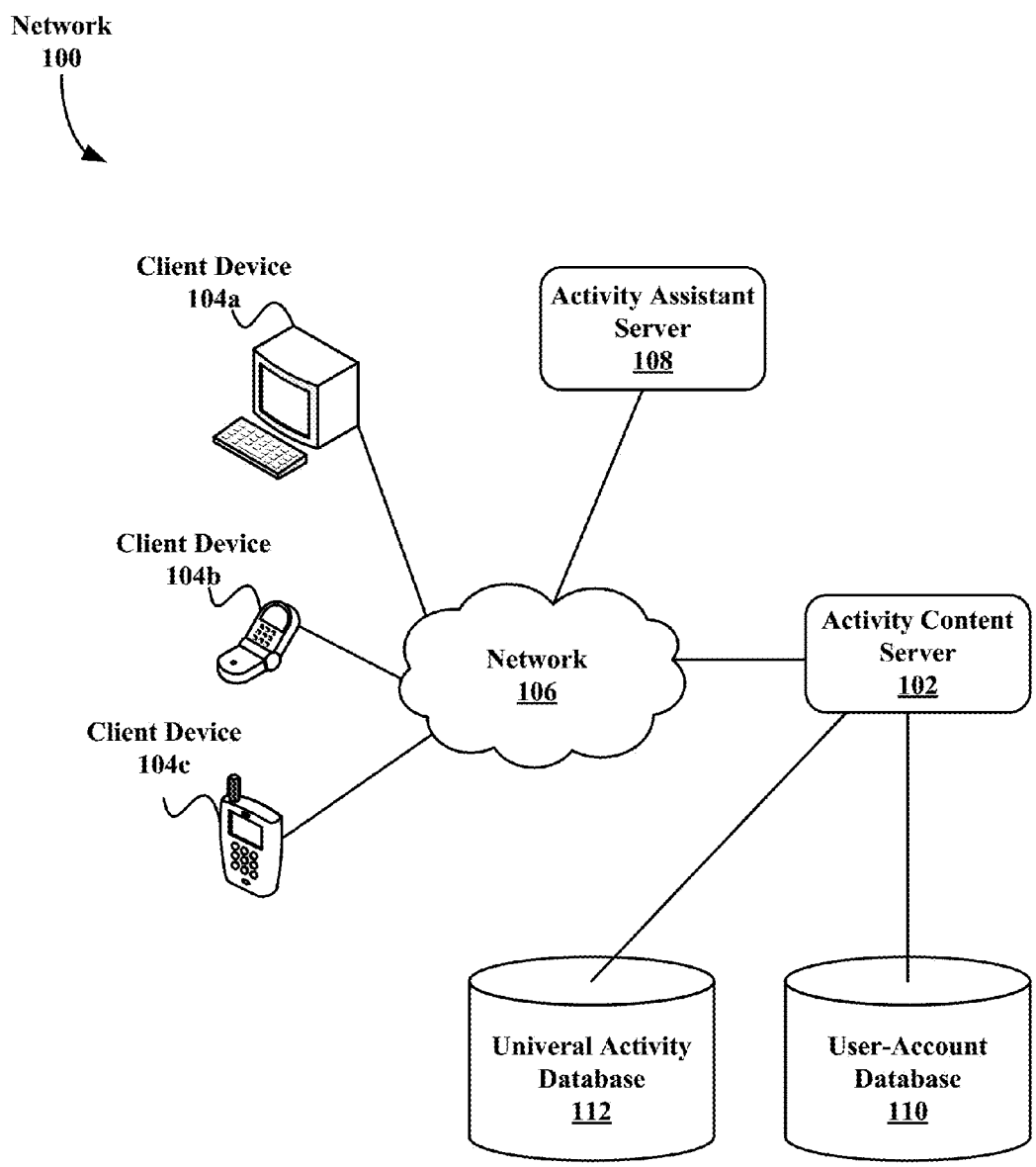
FIG. 1 depicts a network in accordance with an example embodiment.

The following detailed description describes various features and functions of the example systems, devices, and methods with reference to the accompanying figures. It should be understood that the word "example" is used herein to mean "serving as an example, instance, or illustration." Any embodiment described herein as "example" is not necessarily to be construed as preferred or advantageous over other embodiments. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

An "activity", as used here, can be a data construct describing a thing to do, which a user can associate with a user's "activity-assistant account." In an example embodiment, an activity is defined at least in part by one or more singular, global activity parameters. For example, global parameters for a given activity may include: (a) a title or text description (e.g., "get brunch at Boogaloo's restaurant"), (b) data indicating the location that is associated with the activity (e.g., a latitude/longitude and/or a street address of Boogaloo's restaurant), (c) data indicating one or more user "moods" that may be indicative of the activity being more or less well-suited for a given user at a given point in time (e.g., "fun", "social", "cerebral", "productive", "ambitious", etc.), (d) data indicating time constraints on the activity (e.g., the hours that Boogaloo's restaurant is open and/or the hours during which Boogaloo's restaurant serves brunch), and (e) any other data that may be directly or indirectly interpreted to affect the importance of a given activity to a given user.

Generally, an activity is a user-defined construct, and thus the global parameters that define each activity may vary. In particular, a given activity may include all of the above-mentioned global activity parameters, a subset of the above-mentioned parameters, or none of the above-mentioned parameters. For example, a user may create an activity that is not tied to any particular location (e.g., "do homework for math class"), and thus choose not to provide a location. Furthermore, as activities are flexible and dynamic constructs, it should be understood that the above-mentioned examples of global parameters are not limiting. It is also possible that an activity may be generated by a computing system without any initial user input (or alternatively, generated based on some user-provided input).

Once an activity is created, its global parameters may be applied to all users who add the activity or become associated with the activity. Thus, in effect, there is a single copy of each activity and its global parameters that is common to all those users. It should be understood, however, that global parameters can still be flexible and dynamic, and may change over time in relation to the activity. For example, a "popularity" parameter may be defined for an activity that is updated on an ongoing basis to reflect the number of users that have added the activity.

To further allow for customization of activities to a particular user, "user-specific" parameters, which vary between users, may be defined for an activity. Accordingly, while the global parameters of an activity are the same for all users, each user that adds an activity may customize their user-specific parameters for the activity. For instance, user-specific parameters may be used to specify: (a) plans regarding the activity (e.g., "I like to do it", "I want to do it again, but not for a few weeks," "I must do it before Dec 25," "I never want to do it again," etc.), (b) the user's history regarding that activity (e.g., I went there with Lauren on Nov 4 and again with Ryan on Nov 28), (c) personal time constraints based on user preferences (e.g., preference of brunch early on Sunday so that time is available to digest before yoga class at noon), and/or (d) any other personal preferences that may overrides or modify the global parameters (e.g., "I like to go to Boogaloo's restaurant when I'm sad because it cheers me up," "I like to go to Boogaloo's restaurant when I have friends in town," etc.). In a further aspect, an activity may be designated as a "public" or "private" activity. Depending on how a given activity is defined, this designation may be made by setting a global parameter when the activity is created (and thus apply to all users who add the activity), and/or may be made via a user-specific parameter that is settable by each user who adds an activity.

An activity that is designated as "public" via a global parameter may be viewable (and thus addable) to all users, whereas an activity that is designated as "private" via a global parameter may only be viewable to the creator of the activity. In an example embodiment, a global parameter may be set to designate an activity as a "private shared" activity, in which case the activity may only be viewable by the author and the users the author specifies. Further, the fact that a given activity is designated as "public," "private," or "private shared" via a global parameter may be interpreted as a signal relevant to the importance of the activity to a certain user.

When an activity is designated as "private" via a user-specific parameter, other users are generally not notified that the user has added the activity. And when an activity is designated as "public" via a user-specific parameter, other users may be notified and/or be able to see that the user has added the activity. Further, when an activity is designated as "public" via a user-specific parameter, the user may be able to define which other users can view and/or which other users should be notified that they have added the activity.

In an example embodiment, an "activity assistant" is provided, which is configured to evaluate the relative importance of activities to a particular user so that activities can be presented on the activity assistant user interface in a logical manner. In particular, the activity assistant may score an activity based not only on the characteristics of the activity itself, but also based on data that is indicative of the user's "context" (e.g., the user's, interests, intents, moods, experiences, associations with other users, etc.). With the support of the activity assistant, the activity assistant user interface may therefore provide users with a dynamic and flexible mechanism for deciding what activities they might enjoy, and how they would like to spend their time.

In order to quantify the importance of a particular activity for a particular user, the activity assistant may identify and/or determine any number of "signals" that may be directly or indirectly relevant to the importance of an activity to the particular user. From the perspective of the activity assistant, signals may take the form of information provided by global parameters and user-specific parameters taken individually or information determined by evaluating interactions between global parameters, user-specific parameters, and/or other data sources. The activity assistant may evaluate the signals for a particular combination of user and activity, and based on the signals, quantify the importance of the particular activity for the particular user (e.g., by assigning a "score" to the activity).

To provide some examples of such signals, they may include but are not limited to: (a) the level of similarity between user's mood and activity mood, (b) the level of similarity between the user's context (as indicated by user-specific signals and/or user-specific parameters indicating, for example, whether the user is on a desktop computer/mobile phone, on-line/off-line, talking on the phone, driving, walking, etc.) and corresponding activity context requirements and/or restrictions (as indicated by global parameters of the activity), (c) a distance between the user's current detected (or indicated) location and the activity location (if available), (d) the appropriateness of the activity for the current weather conditions at the user's current or indicated location and/or the current weather conditions at the activity's indicated location (e.g., rainy, sunny, snowy, etc.), (e) a user-designated priority for the activity, (f) a user-designated due date (or next due date, if recurring), (f) a user's snooze history or pattern for the activity, (g) an amount of time required for the activity, (h) a progress or status of the activity (done, active, in-progress, etc.), (i) ownership of the activity (e.g., whether the owner is the particular user in question or another user), (j) whether the user received an invitation to the activity or just a notice that the activity exists (e.g., a "heads-up"), (k) a popularity of the activity (e.g., number of comments on an activity, or the number of people who have commented, copied, liked, shared, done, or followed the activity), (l) a similarity between a user query string and the activity text (for search/suggest), (m) a similarity between a user query string and the names or e-mails of other users associated with the activity (for search/suggest), (n) a similarity between user query string and activity comment text (for search/suggest), and (o) whether the user indicated another user with whom to participate in the activity with. Other possibilities exist as well.

Supported with this intelligence from the activity assistant, the activity assistant user interface may present activities that a particular user has associated with their account in a logical order that is based at least in part upon the relative importance of the activities to the user. In particular, the activity assistant may evaluate the signals for each activity in a user's activity list (e.g., each activity that has been added by the user) and assign a score to the activity. The activity assistant can then rank the activities in the user's activity list according to their respectively determined score, and relay this information to the activity assistant user interface so that it can adjust the displayed activity list accordingly.

Further, the intelligence of the activity assistant may be utilized to provide "suggested" activities that are tailored to the particular user's preferences, tendencies, location, time table, associated other users, and/or mood at a given point in time. In particular, the activity assistant may initiate an activity search that takes into account the scores of activities when ranking the search results, and these search results may be presented to the user via the activity assistant user interface. In a similar manner, the activity assistant may support an "activity search" feature of the activity assistant user interface. This feature may allow the user to enter text and initiate an activity search on the text, the results of which factor in the relative scores of activities as assessed by the activity assistant.

For situations in which the systems discussed herein collect personal information about users, the users may be provided with an opportunity to opt in/out of programs or features that may collect personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

According to an example embodiment, a user interface is provided that allows for intuitive user interaction with such activities. This user interface may be generally referred to herein as an "activity assistant user interface". A user typically accesses the activity assistant user interface by logging in to a user's activity-assistant account. According to an example embodiment, the activity assistant user interface displays graphical representations of activities to a user in a logical manner that varies according to the interests, intents, associations with other users, and moods of the user. Via the activity assistant user interface, the user may view activities they have added to a personal "activity list," view suggested activities, create and add new activities to their activity list, and/or add/delete existing activities (e.g. those created by other users) to/from their activity list, among other functions.

Turning to the figures, FIG. 1 depicts a network in accordance with an example embodiment. In network 100, activity assistant server 108 and possibly activity content server 102 are configured to communicate, via a network 106, with client devices 104a, 104b, and 104c. As shown in FIG. 1, client devices can include a personal computer 104a, a telephone 104b, and a smart-phone 104c. More generally, the client devices 104a, 104b, and 104c (or any additional client devices) can be any sort of computing device, such as an ordinary laptop computer, desktop computer, network terminal, wireless communication device (e.g., a cell phone or smart phone), and so on.

The network 106 can correspond to a local area network, a wide area network, a corporate intranet, the public Internet, combinations thereof, or any other type of network(s) configured to provide communication between networked computing devices. Activity content server 102 can provide content to client device 104a-104c and/or activity assistant server 108. The content can include, but is not limited to, web pages, hypertext, scripts, binary data such as compiled software, images, audio, and/or video. The content can include compressed and/or uncompressed content and/or encrypted and/or unencrypted content. Other types of content are possible as well.

In an alternative arrangement, activity assistant server 108 and activity content server 102 can be co-located and/or combined as a common server. Further, it also possible that activity assistant server 108 and/or activity content server 102 can be accessible via a network separate from the network 106. Yet further, although FIG. 1 only shows three client devices, activity assistant server 108 and/or activity content server 102 can serve any number of client devices (from a single client device to hundreds, thousands, or even more client devices).

Global activity database 112 typically includes activity data that defines a plurality of activities. In particular, the activity data for each activity may include one or more global activity parameters that collectively define the global context for the activity. Further, user-account database 110 may include per-account data for users' activity accounts. This per-account data may include, for a given one of the accounts, data indicating user-specific parameters and signals. Further, for a given activity account, the per-account data may include an indication of which activities, if any, are associated with the account (e.g., the activities that a user has added to their activity list).

According to an example embodiment, activity assistant server 108 embodies the "activity assistant" and thus is configured to provide the activity-assistant functionality described herein. In particular, activity assistant server 108 may be configured to identify signals relating to the importance of a particular activity to a particular user (e.g., relating to a given user-activity pair), so that activities can be logically displayed to a user, suggested to a user, and/or searched for a user via an activity assistant user interface.

In some embodiments, activity-assistant functionality described herein may also be performed by software on the device such as, but not limited to, devices 104a, 104b, and 104c as shown in FIG. 1. For example, the client software running on the device such as, but not limited to, devices 104a, 104b, and 104c as shown in FIG. 1 may perform all or some portion of the ranking functionality and/or provide more advanced assistance, e.g. by providing a latitude/longitude and/or map for an address entered by the user via an activity assistant user interface and/or by directly communicating with an activity assistant processing system.

The activity assistant server 108 may acquire the data from which signals are determined, and/or data directly providing signals, from a number of different data sources. For example, activity content server 102 may provide activity assistant server 108 with access to global activity database 112 and user-account database 110. Thus, when evaluating the importance of a particular activity to a particular user, activity assistant server 108 may retrieve the global parameters of the activity from global activity database 112, as well as user-specific parameters from user-account database 110.

Figure 2A:
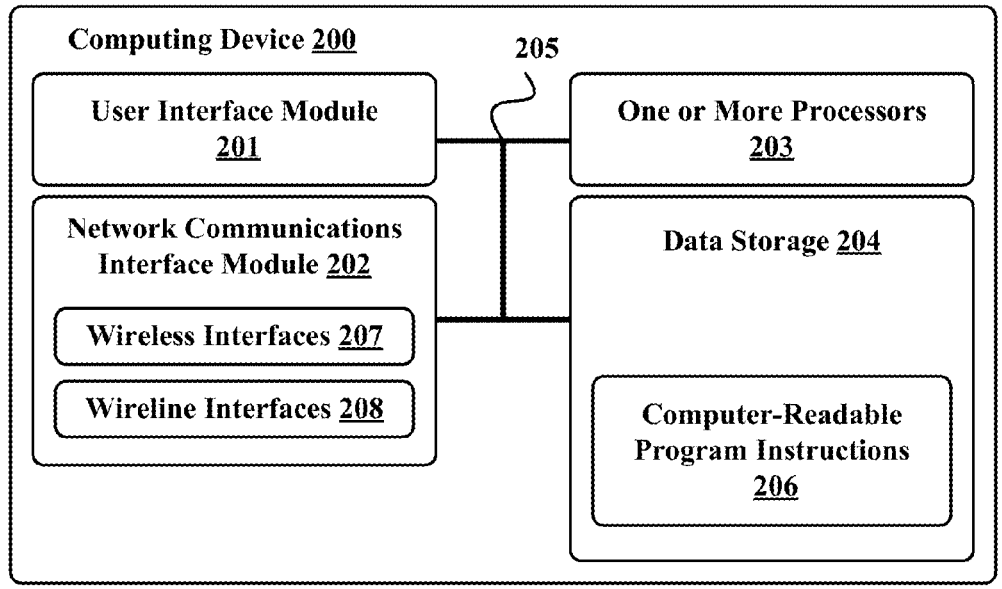
FIG. 2A is a block diagram of a computing device in accordance with an example embodiment.

FIG. 2A is a block diagram of a computing device in accordance with an example embodiment. Computing device 200 can be configured to perform one or more functions of client devices 104a, 104b, and 104c, activity assistant server 108, and/or activity content server 102. The computing device 200 can include a user interface module 201, a network-communication interface module 202, one or more processors 203, and/or data storage 204, all of which can be linked together via a system bus, network, or other connection mechanism 205.

The user interface module 201 can be operable to send data to and/or receive data from external user input/output devices. For example, the user interface module 201 can be configured to send/receive data to/from user input devices such as a keyboard, a keypad, a touch screen, a computer mouse, a track ball, a joystick, a microphone, and/or other similar devices, now known or later developed. The user interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 can also be configured to receive audible input(s) via the microphone (or similar audio input device) and/or generate audible output(s), such as a speaker, speaker jack, audio output port, audio output device, earphones, and/or other similar devices, now known or later developed.

The network-communications interface module 202 can include one or more wireless interfaces 207 and/or wireline interfaces 208 that are configurable to communicate via a network, such as the network 106 shown in FIG. 1. The wireless interfaces 207 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 208 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 202 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 203 can include one or more general purpose processors and/or one or more special purpose processors (e.g., digital signal processors, application specific integrated circuits, etc.). The one or more processors 203 can be configured to execute computer-readable program instructions 206 that are contained in the data storage 204 and/or other instructions as described herein.

The data storage 204 can include one or more computer-readable storage media that can be read or accessed by at least one of the processors 203. The one or more computer-readable storage media can include volatile and/or non-volatile storage components, such as optical, magnetic, organic or other memory or disc storage, which can be integrated in whole or in part with at least one of the one or more processors 203. In some embodiments, the data storage 204 can be implemented using a single physical device (e.g., one optical, magnetic, organic or other memory or disc storage unit), while in other embodiments, the data storage 204 can be implemented using two or more physical devices.

Computer-readable storage media associated with data storage 204 and/or other computer-readable media described herein can also include non-transitory computer-readable media such as computer-readable media that stores data for short periods of time like register memory, processor cache, and random access memory (RAM). Computer-readable storage media associated with data storage 204 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 204 and/or other computer-readable media described herein can also be any other volatile or non-volatile storage systems. Computer-readable storage media associated with data storage 204 and/or other computer-readable media described herein can be considered computer readable storage media for example, or a tangible storage device.

The data storage 204 can include computer-readable program instructions 206 and perhaps additional data. In some embodiments, the data storage 204 can additionally include storage required to perform at least part of the herein-described techniques, methods, and/or at least part of the functionality of the herein-described devices and networks.

Figure 2B:
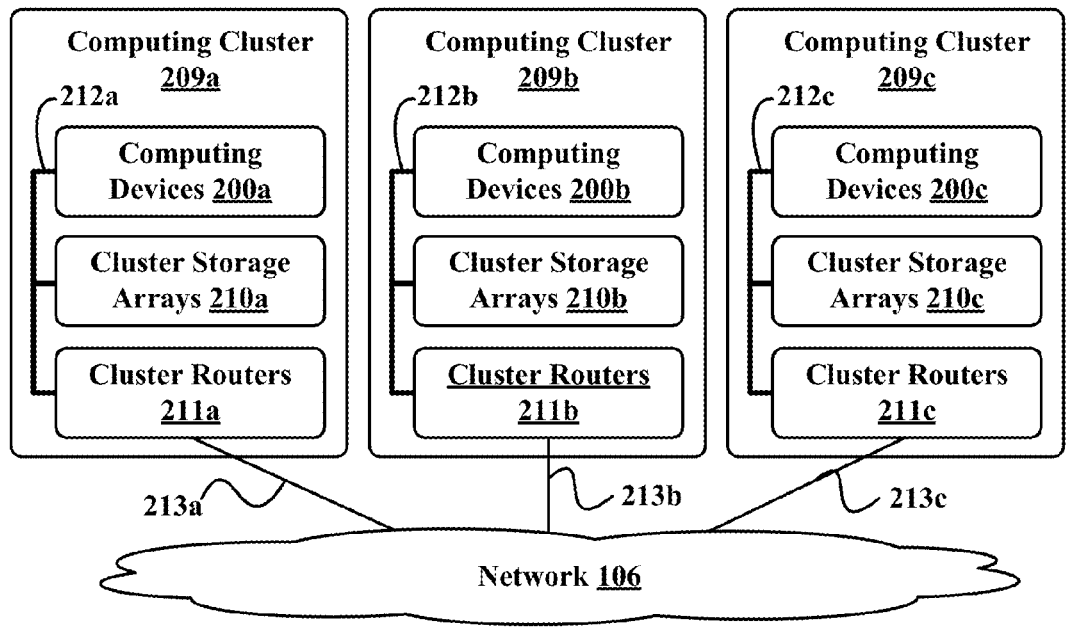
FIG. 2B depicts a network with computing clusters in accordance with an example embodiment.

FIG. 2B depicts a network 106 with computing clusters 209a, 209b, and 209c in accordance with an example embodiment. In FIG. 2B, functions of activity content server 102, activity assistant server 108, user account datastore 110, and/or universal activity datastore 112 can be distributed among three computing clusters 209a, 209b, and 208c. The computing cluster 209a can include one or more computing devices 200a, cluster storage arrays 210a, and cluster routers 211a connected by local cluster network 212a. Similarly, computing cluster 209b can include one or more computing devices 200b, cluster storage arrays 210b, and cluster routers 211b connected by local cluster network 212b. Likewise, computing cluster 209c can include one or more computing devices 200c, cluster storage arrays 210c, and cluster routers 211c connected by a local cluster network 212c.

In some embodiments, each of computing clusters 209a, 209b, and 209c can have an equal number of computing devices, an equal number of cluster storage arrays, and an equal number of cluster routers. In other embodiments, however, some or all of computing clusters 209a, 209b, and 209c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of activity content server 102. In one embodiment, the various functionalities of activity content server 102 can be distributed among one or more of the computing devices 200a. For example, some of these computing devices can be configured to provide part or all of a first set of content while the remaining computing devices can provide part or all of a second set of content. Still other computing devices of the computing cluster 209a can be configured to communicate with activity assistant server 108. Computing devices 200b and 200c in computing clusters 209b and 209c can be configured the same or similarly to the computing devices 200a in computing cluster 209a.

On the other hand, in some embodiments, computing devices 200a, 200b, and 200c each can be configured to perform different functions. For example, computing devices 200a and 200b can be configured to perform one or more functions of activity content server 102, and the computing devices 200c can be configured to perform one or more functions of activity assistant server 108.

Cluster storage arrays 210a, 210b, and 210c of computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of activity content server 102, activity assistant server 108, user account datastore 110, and/or universal activity datastore 112 can be distributed across computing devices 200a, 200b, and 200c of respective computing clusters 209a, 209b, and 209c, various active portions and/or backup/redundant portions of these components can be distributed across cluster storage arrays 210a, 210b, and 210c. For example, some cluster storage arrays can be configured to store data for activity assistant server 108, while other cluster storage arrays can store data for activity content server 102. Additionally, some cluster storage arrays can be configured to store backup versions of data stored in other cluster storage arrays.

The cluster routers 211a, 211b, and 211c in the computing clusters 209a, 209b, and 209c can include networking equipment configured to provide internal and external communications for the computing clusters. For example, the cluster routers 211a in the computing cluster 209a can include one or more internet switching and/or routing devices configured to provide (i) local area network communications between the computing devices 200a and the cluster storage arrays 201a via the local cluster network 212a, and/or (ii) wide area network communications between the computing cluster 209a and the computing clusters 209b and 209c via the wide area network connection 213a to the network 106. The cluster routers 211b and 211c can include network equipment similar to the cluster routers 211a, and the cluster routers 211b and 211c can perform similar networking functions for the computing clusters 209b and 209b that the cluster routers 211a perform for the computing cluster 209a.

In some embodiments, computing tasks and stored data associated with activity content server 102, activity assistant server 108, user account datastore 110, and/or universal activity datastore 112 can be distributed across the computing devices 200a, 200b, and 200c based at least in part on the processing requirements for functions of activity content server 102, activity assistant server 108, user account datastore 110, and/or universal activity datastore 112, the processing capabilities of the computing devices 200a, 200b, and 200c, the latency of the local cluster networks 212a, 212b, and 212c, the wide area network connections 213a, 213b, and 213c, and/or other factors that can contribute to the cost, speed, fault-tolerance, resiliency, efficiency, and/or other design goals of the overall system architecture.

Additionally, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of the local cluster networks 212a, 212b, 212c, the latency, throughput, and cost of the wide area network connections 213a, 213b, and 213c, and/or other factors that can contribute to the cost, speed, fault-tolerance, resiliency, efficiency and/or other design goals of the system architecture.

Figure 3A:
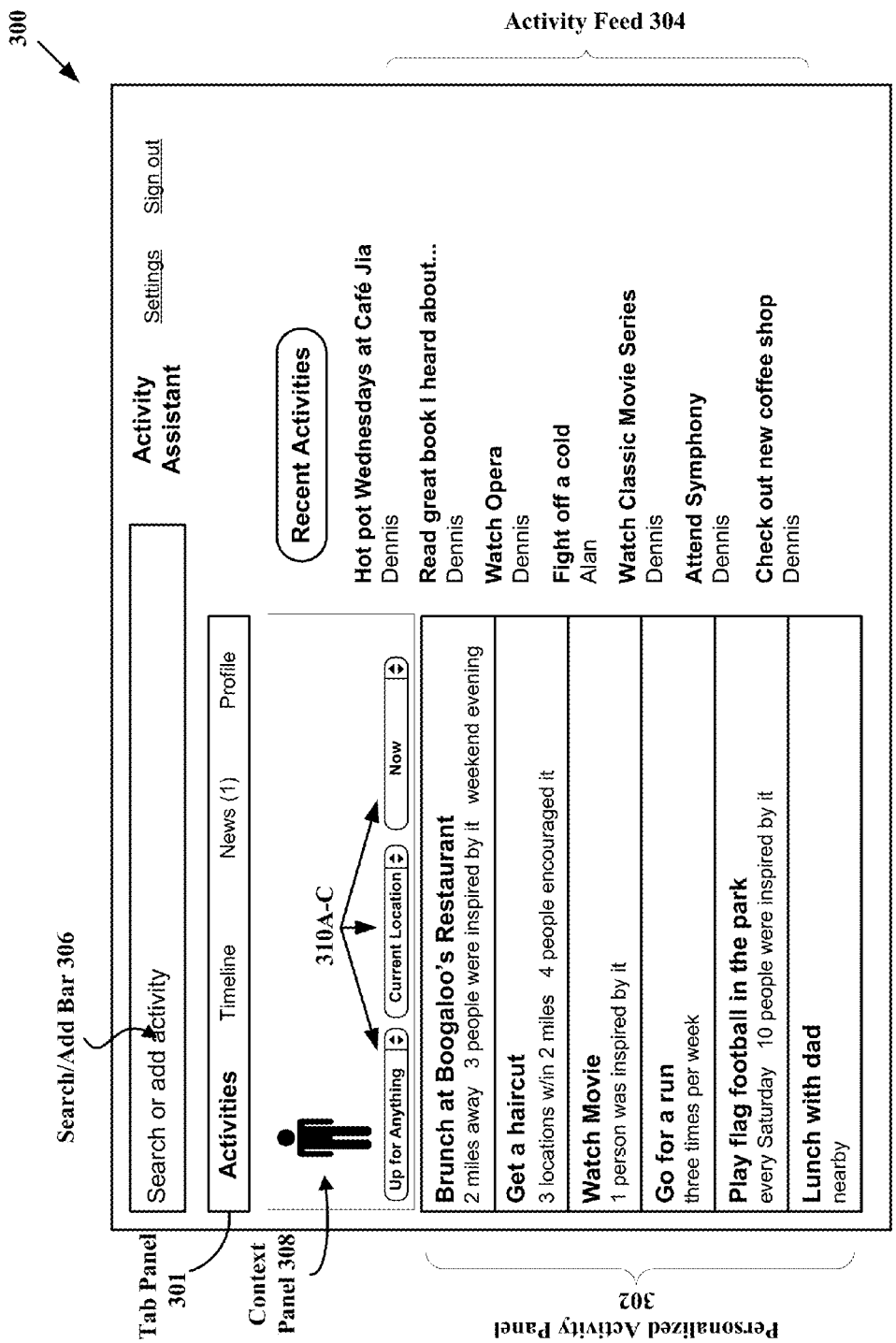
FIG. 3A is a block diagram illustrating features of a user interface, according to an example embodiment.

FIG. 3A is a block diagram illustrating features of a user interface, according to an example embodiment. In particular, activity-assistant user interface 300 may be displayed via a client device once a user has logged in to their activity-assistant account, and may allow a user to interact with an activity assistant. While only one screen of the activity-assistant user interface 300 is shown, it should be understood that the activity-assistant user interface may include other screens, which provide additional functionality, without departing from the scope of the invention. As shown, activity-assistant user interface 300 includes a personalized activity panel 302, an activity feed 304 that displays activities that have been added, done, and/or recently updated by friends of the user (or members of the user's social graph and/or social network), a search/add bar 306, and a context panel 308. Further, context panel 308 includes a number of input mechanisms 310 A-C via which a user can input context signals.

The tab menu panel 301 acts as a menu selection bar, and may determine the content of the remainder of the user interface 300. As shown in FIG. 3A, the Activities tab is currently selected, and as a result, the personalized activity panel 302 and the activity feed 304 are displayed. The Timeline tab may bring up a time-based ordering of activities. The News tab may bring up a listing of activities, announcements, and/or actions (e.g., "today your friend did the activity 'watch movie' that you inspired him/her to add") of other users with which the current user is associated. The profile tab may allow the current user to modify settings, such as login preferences, display settings, and/or how the current user's information appears to other users (name, privacy settings, etc), among others. In some embodiments, a subset of the tabs illustrated in FIG. 3A may be provided, and in other embodiments, a superset of the tabs may be provided.

The context panel 308 provides an interactive mechanism for users to provide context signal data that describes a "user context" (e.g. to provide signals indicative of the user's intent, interest, mood, state-of-mind, experience, perception, associations with other users, etc.). In the illustrated example, input mechanism 310A on the left of context panel 308 allows a user to signal their mood (e.g., "up for anything", "lazy", "productive", "social", etc.). The input mechanism 310B in the center of context panel 308 allows a user to signal a location (e.g., "current location", "home", "work", "stadium", etc.). Further, input mechanism 310C on the right of context panel 308 allows a user to signal a time or timeframe (e.g., "now", "tomorrow", "tonight", "next Wednesday morning", "2:00 AM CST", "9:00 PM EST on Saturday", etc.). Other input mechanisms are possible as well.

While the context information provided via the input mechanisms of the context panel 308 may be referred to as "signals" from the user, it should be understood that, programmatically, this information may take the form of user-specific parameters that are associated with the user's activity account. As such, the data provided via input mechanisms 310 A-C may be stored in a user-account database. For example, referring back to FIG. 1, data from input mechanisms 310 A-C may be stored as user-specific parameters in user-account database 110. It is also possible that activity assistant server 108 may be fed data or may pull data directly from input mechanisms 310 in real-time.

The context signal data acquired from the context panel 308 (e.g., user-specific parameters related to "user context") may be combined by the activity assistant (e.g., activity-assistant server 108 and/or activity content server 102) with global parameters of a given activity, other user-specific parameters, and/or data from other sources, in order to derive signals indicative of activity-importance of the given activity to the user. In this context, the "signals" are the information relative to the importance of the activity that is derived from the data (e.g., the user-specific parameters, global parameters, etc.). As such, the activity assistant may interpret a user-parameter as a signal in and of itself.

For instance, the user's mood (provided via input mechanism 310A) may be interpreted as a signal that makes any number of activities more or less important for the user. As a specific example, if the user's mood is "lazy", the activity "watching a movie" may become more important than it otherwise would be (as global parameters may indicate that "lazy" is a mood associated with the "watching a movie" activity). On the other hand, the activity "go to the gym" may become less important than it otherwise would be (as global parameters of "watching a movie" do not typically include "lazy" as an associated mood, or may in fact indicate that "lazy" is a mood that is likely incompatible with this activity).

The activity assistant may also derive more complex signals by evaluating the relationships and/or interactions between user-specific parameters, global parameters, and/or other data items. To provide an example, a user may have provided a "love being outdoors" signal, which may be stored in the user's account as a user-specific parameter (note that a user interface input mechanism not shown on the user interface 300, but is contemplated as being available). At a given point in time, the user also may have set their mood to "active" via input mechanism 310A, set their location to "current location" via input mechanism 310B, and set their time to "tomorrow afternoon". The activity assistant may interpret this data as including a signal that the user would like to do something active tomorrow afternoon at the same place they are currently located.

Further, the activity assistant may use other data sources to determine other relevant signals, such as the weather forecast for the next day at the user's current location or the location that the user will likely be at the next day. Tomorrow afternoon's weather forecast may thus be a signal, which can be combined with the signal derived from the user-specific parameters to provide a more-refined signal that, for example, outdoor fitness or sporting activities near the user's location should always be favored over indoor fitness or sporting activities near the user's location, unless the tomorrow afternoon's forecast is for rain, in which case the amount by which outdoor activities are favored over indoor activities may be reduced (or indoor activities may actually be favored). For instance, combining all of this information, the activity assistant may increase the importance of active outdoor activities (e.g., "go for a run", "play flag football", etc.) to a greater extent when the forecast is for sunny weather, than when the forecast is for rain or snow.

The activity assistant may apply signal-based techniques, such as those described herein, to assess activity-importance for a number of activities and the importance of these activities relative to one another. This technique may be employed to provide the user with various functions that are tailored to the user's context.

For example, personalized activity panel 302 may display intelligently selected and ordered activities from a pool of activities including the activities a user has added to their account and suggested activities that have been selected for a user. For example, a number of suggested activities may be determined based on factors such as user preferences, signals from the context panel, global parameters of potential activities, activities that have been added and/or done by friends of the user, and/or activities that have been added and/or done by the user in the past, among others. These suggested activities may then be combined with the activities a user has already added to create a pool of potential activities for the personalized activity panel 302. Then, to determine which specific activities to display in personalized activity panel 302, the activity assistant may quantify the importance of each activity (e.g., by evaluating signals for each activity), so that the activities that are most important to the user are displayed.

Note that personalized activity panel 302 may visually differentiate between activities that a user has already added to their account, and suggested activities. For example, the "Watch Movie" activity is displayed with a dark background and white text to indicate that it is a suggested activity (and that the user may thus wish to add it), whereas the other activities listed in personalized activity panel 302 all have a white background with black text, thus indicating that the user has already added these activities.

Further, the evaluation of importance may also be applied in the process of determining which activities should be displayed in the activity feed 304 (and possibly the order in which those activities are displayed). In particular, a certain number of the most recently-added and updated activities may be evaluated based on signals such as those described above, and the most important of the recent activities may be displayed (possibly in the order of importance. Alternatively, it should be understood that activity feed 304 may simply display activities in a time-wise manner as they are added/updated/completed, without adjusting based on the user's context. In a similar manner, search results (not shown) for an activity search via search/add bar 306 may be displayed based at least in part on importance of the activities located in the search, or may simply be displayed in an order according to one of the many well-known search techniques.

Figure 3B:
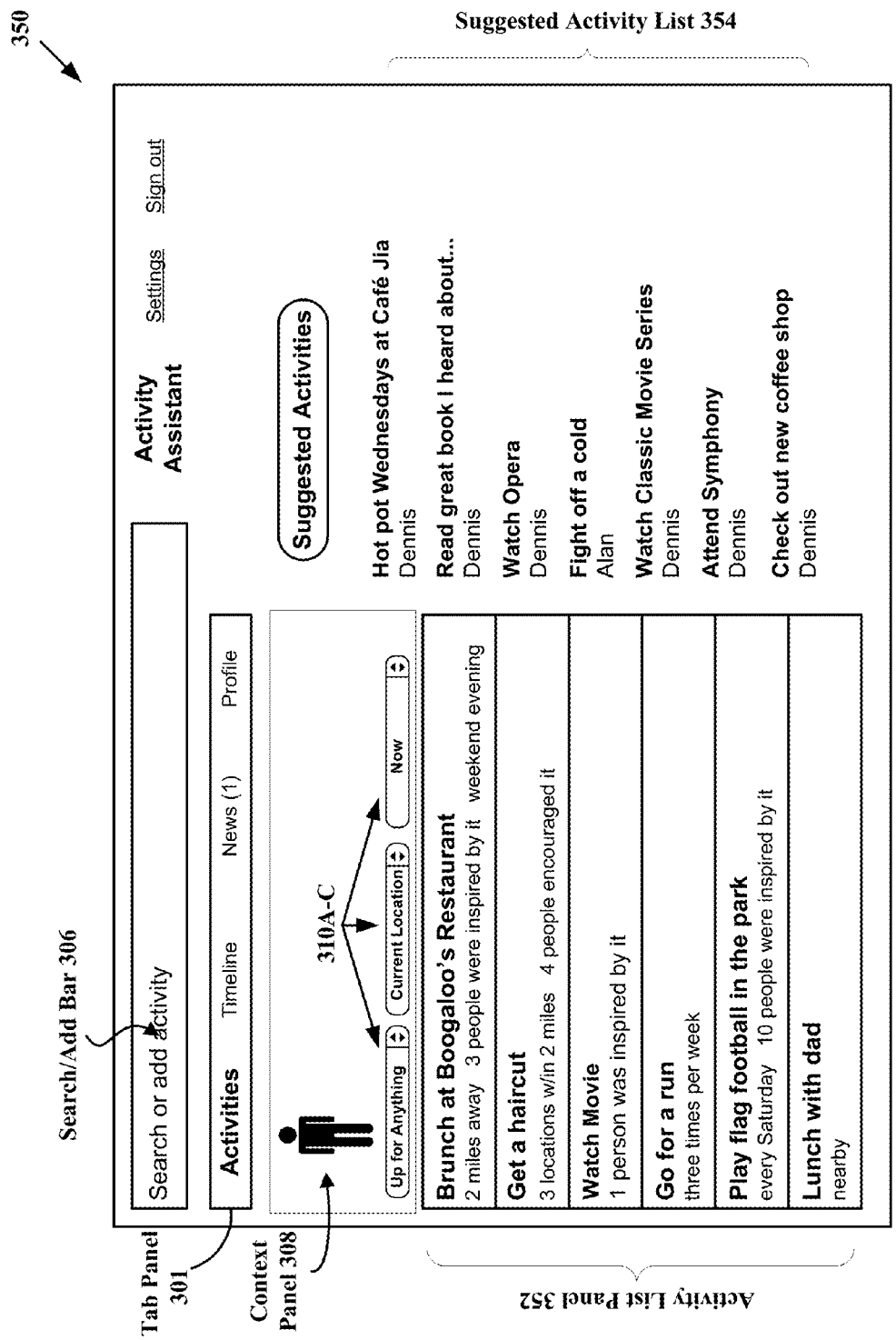
FIG. 3B is another block diagram illustrating features of a user interface, according to an example embodiment.

FIG. 3B is another block diagram illustrating features of a user interface, according to an example embodiment. In particular, FIG. 3B illustrates an alternative activity-assistant user interface 350, which may be displayed via a client device once a user has logged in to their activity-assistant account. Activity-assistant user interface 350 includes some of the same UI elements as activity-assistant user interface 300 of FIG. 3A (e.g., search/add bar 306 and context panel 308 including a number of input mechanisms 310 A-C). However, activity-assistant user interface 350 includes an activity list 352 and a suggested activity list 354.

In this embodiment, activity list 352 may include only activities that a user has added to their account. Thus, by evaluating signals for each activity a user has added to their account, the activity assistant can determine which activities should be displayed in activity list 352 (and the order in which those activities should be displayed).

Furthermore, suggested activity list 354 may display only suggested activities (which have not yet been added by the user.) Accordingly, the importance of specific activities may also be a factor in the process of determining which activities should be displayed in the suggested activity list 354 (and the order of those activities).

Figure 4:
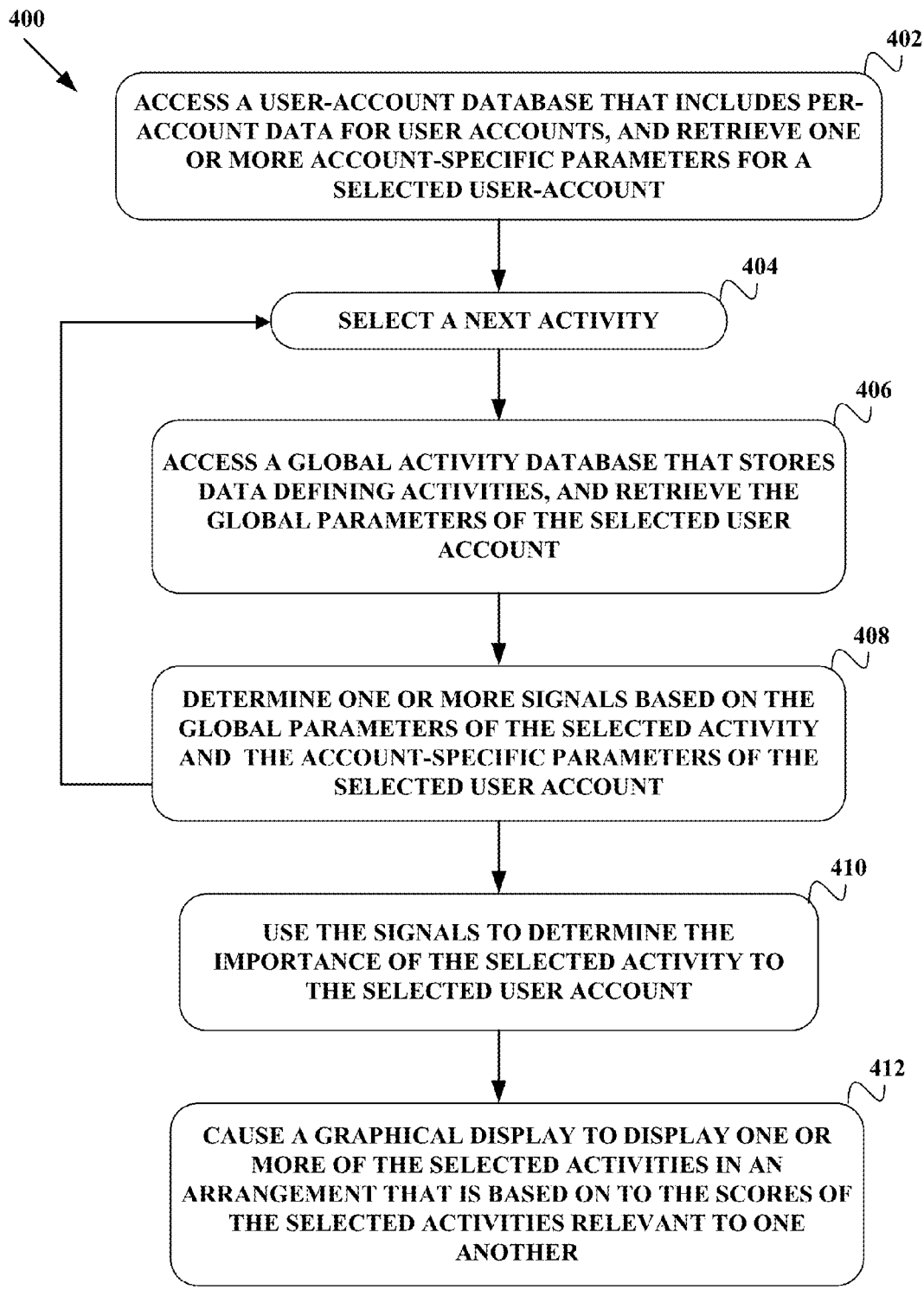
FIG. 4 is flow chart illustrating a method according to an example embodiment.

FIG. 4 is flow chart illustrating a method according to an example embodiment.

In particular, method 400 may be carried out by an activity assistant in order to facilitate dynamic and flexible and activities. For example, activity assistant server 108 and/or user account server 102 of FIG. 1 may carry out a method such as method 400 to facilitate dynamic user interaction with activities via an interface such as activity-assistant user interfaces of FIGS. 3A and 3B.

More specifically, method 400 involves the activity assistant accessing a user-account database and retrieving the one or more account-specific parameters of a selected user account, as shown by block 402. The activity assistant then selects a next activity, as shown by block 404, and accesses a global activity database to retrieve the global parameters of a selected activity, as shown by block 406. Then, for the combination of the selected user account and the selected activity, the activity assistant determines one or more signals based at least in part on the global parameters of the selected activity and the account-specific parameters of the selected user account, as shown by block 408. Also as shown by block 408, each signal provides an indication as to the importance of the selected activity to the selected user account. Accordingly, the activity assistant can then use the determined signals as a basis for determining the importance of the selected activity for the selected user, as shown by block 410. The activity assistant may then cause a graphical display to display one or more of the selected activities in an arrangement that is based at least in part on to the importance of the selected activities relevant to one another.

Figure 5:
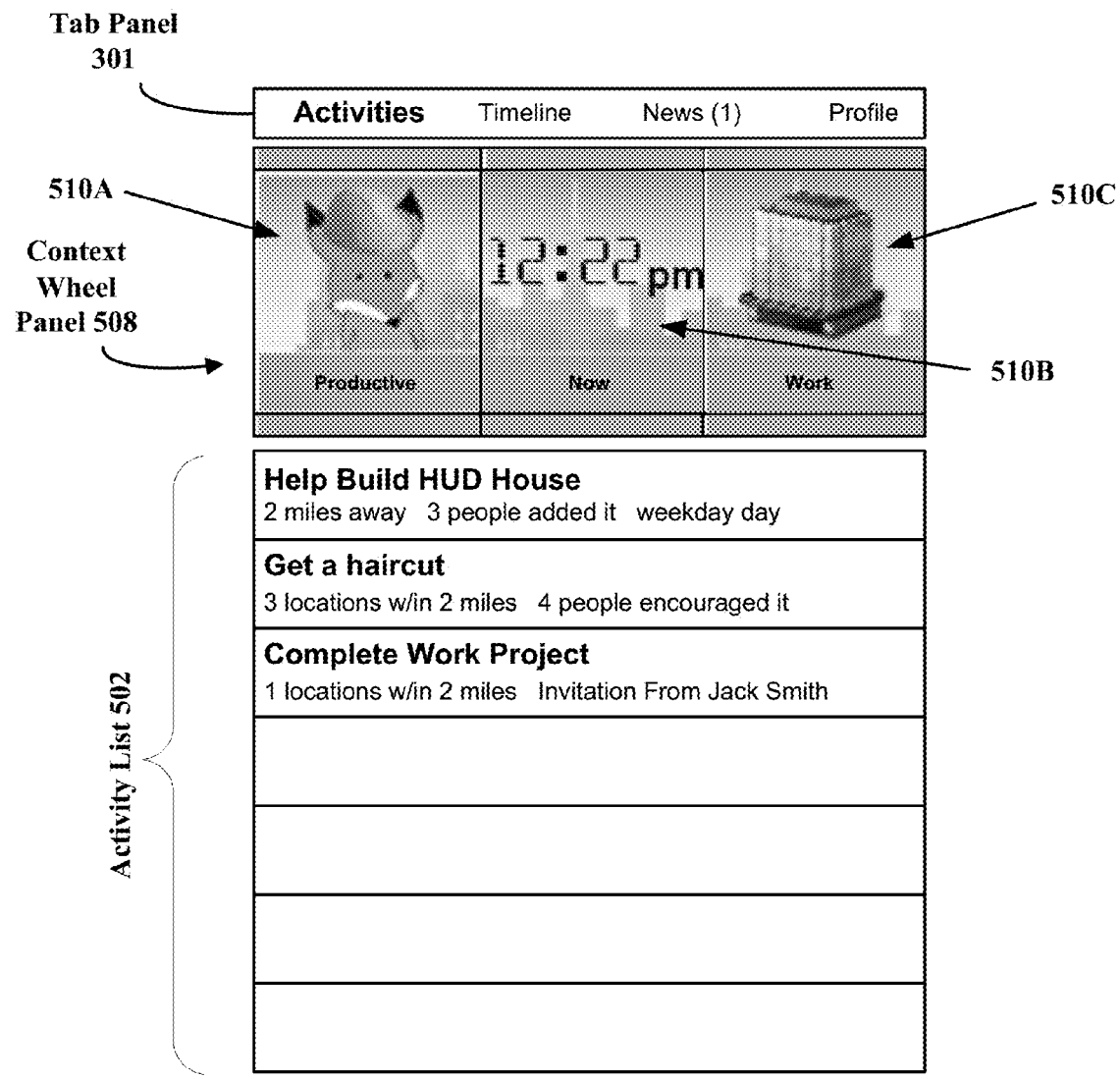
FIG. 5 is a block diagram illustrating features of an alternative user interface, according to an example embodiment.

FIG. 5 is a block diagram illustrating features of an alternative activity assistant UI, according to an example embodiment. The alternative activity assistant UI may be appropriate for more limited viewing devices, such as mobile phones, tablets, and other devices having limited screen dimensions and/or resolution. For example, the activity assistant UI of FIG. 5 may be suitable as an interface for an application running on one of the above-noted devices. Alternatively, the activity assistant UI of FIG. 5 may be a web-interface provided to one of the above-noted devices responsive to detecting the type of the device (e.g., perhaps via detection of a user-agent string). In the embodiment illustrated in FIG. 5, the tab panel 301 at the top of the screen, including an Activities tab, Timeline tab, News tab, and Profile tab, are retained from the example in FIG. 3A. Additionally, the personalized activity panel 302 appearing underneath the context panel 308 in FIG. 3A is also retained. The activity feed 304 (or could possibly be integrated with the personalized activity panel 302).

Furthermore, the drop down boxes 310A-C appearing in the context panel 308 of FIG. 5 are replaced with scrollable context wheels 510A-C appearing in the context wheel panel 508. Although three context wheels 510A-C are illustrated in FIG. 5, in other embodiments, less than three context wheels 510 may be provided, and in some embodiments, more than three context wheels 510 may be provided. For example, in at least one embodiment, a fourth context wheel may be added defining associations with other users. For example, the fourth context wheel may describe another person with whom the user wants to do an activity (or perhaps another person with whom the user does not wish to do an activity). In accordance with the setting of the fourth context wheel, the activity assistant could modify the content and/or ordering of the activities in the activity list. Other possibilities exist as well.

Although each of the context wheels 510A-C are illustrated in FIG. 5 as including a text label and associated image, in other embodiments, one or the other of the text label and associated image could be displayed instead. Each of the user interface elements 510A-C is described as a context wheel due to the fact that each element may be pulled or pushed upwards or downwards to cause a "virtual" wheel to rotate containing respective options associated with each wheel in an endless manner. As used herein, the phrase "context wheel" refers to a selectable (e.g., scrollable) user interface element (e.g., "selectable context element" or "scrollable context element"). This feature will be described in more detail with respect to FIGS. 5-7. It is important to note, however, that the identification of the user elements 510A-C as context wheels is for descriptive purposes only, and is not intended to limit the scope of the term.

Specifically, the term "wheel" is not intended to be limited to the traditional (cylindrical) wheel shape, but rather, refers to any 3-D shape that can be virtually represented as an endless rotation of surfaces (which may contain various user options or user parameters), including, but not limited to, a cube, a cuboid, a sphere, a prism (hexagonal, pentagonal, etc), and a pyramid.

FIG. 5 illustrates an initial example state of the context wheel panel 508, including context wheels 510A-C. Each context wheel 510A-C of FIG. 5 is associated with, and has a similar functional result, to the drop-boxes 310A-C described with respect to FIG. 3A above. For example, context wheel 510A is associated with a current mood of a user. Context wheel 510B is associated with a time window in which the user is interested in finding activities. Context wheel 510C is associated with a location around which the user is interested in finding activities. In some embodiments, a horizontally-extending center-line may be superimposed across a center of the context wheel panel 508 to aid a user in selecting a parameter for each context wheel 510A-C.

In the initial state of the context wheel panel 508 illustrated in FIG. 5, the mood context wheel 510A is set to "Productive," the time context wheel 510B is set to "Now," and the location context wheel 510C is set to "Work." The "Productive" setting on the mood context wheel 510A is meant to signal to the activity assistant that the user is currently interested in finding a productive activity. In accordance with the "Productive" setting, an image associated with a productive mood is shown, which in this case is a figure with a hard-hat on. Additionally, a text label ("Productive") is provided below the image identifying the current setting.

The "Now" setting on the time context wheel 510B is meant to signal to the activity assistant that the user is currently interested in finding an activity that has either already started or is about to start, or is otherwise available to do anytime (for example, walking the dog). Furthermore, even for activities that are available anytime, certain of those activities may have more optimal times during which they appear higher in the activity list 502 (for example, walking the dog in the morning, or 5 hours since the last time the dog was walked). In accordance with the "Now" setting, an image is displayed showing the current time (e.g., 12:22 pm, which may be associated with a lunchtime break from work). In another embodiment, the current day and/or date may also be displayed. Below the image, a text label ("Now") is provided identifying the current setting. The settings available on the time context wheel 510B may vary based on the detected current time of day and/or day of week. For example, if it is currently Friday, the options available on the time context wheel 510B may, besides "Now," include "This Weekend," "Next Week," and "Next Weekend." On the other hand, if it is currently Wednesday, the options available on the time context wheel 510B may, besides "Now," include "This Week," "This Weekend," and "Next Week." Additionally, if the current time is early in the morning, the time context wheel 510B may include, besides "Now," "This Morning," "This Afternoon," and "This Evening." On the other hand, if the current time is late in the afternoon, the time context wheel 510B may include, besides "Now," "This evening," "Tomorrow Morning," and "Tomorrow Afternoon." Other possibilities exist as well.

The "Work" setting on the location context wheel 510C is meant to signal to the activity assistant that the user is currently interested in finding an activity around the user's work location. In accordance with the "Work" setting, an image is displayed of a work building. Below the image, a text label ("Work") is provided identifying the current setting.

Based on the current settings of the context wheels 510A-C in the context panel 508, signals may be provided to the activity assistant that aid the activity assistant in filtering the activities appearing (and perhaps their order) in the activity list 502. For example, based on the state of the context panel 508 in FIG. 5, activity list 502 sets forth three examples of productive activities that are available near the user's work location and can be started now, including "Help Build HUD House," "Get a Haircut," and "Complete Work Project."

Figure 6:
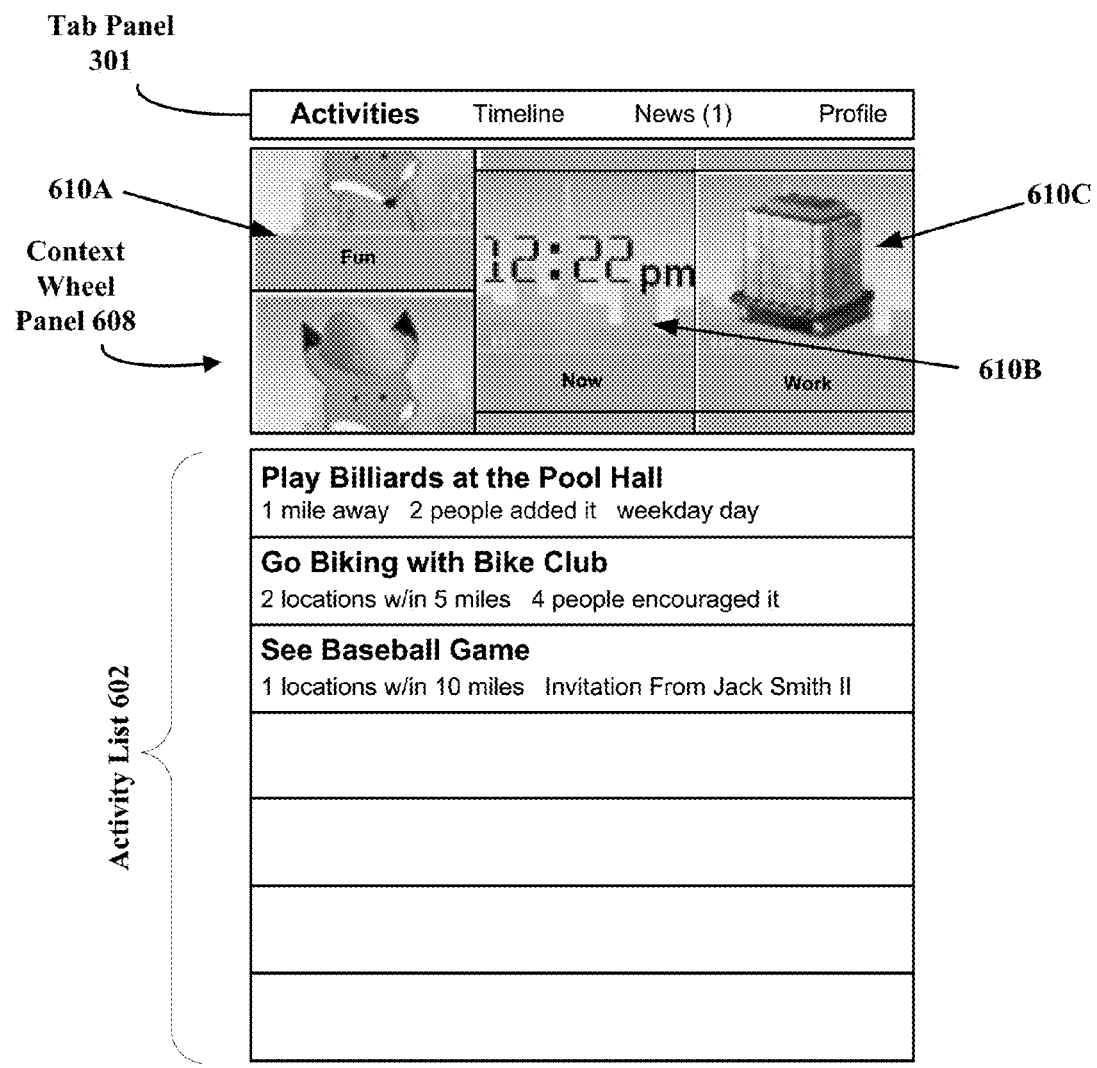
FIG. 6 is a block diagram further illustrating features of the alternative user interface of FIG. 5.

FIG. 6 illustrates the modification of one of the context wheels 510A-C via a rotation process. Based on the input device(s) available at the computing device on which the activity assistant UI is being executed, context wheels 610A-C may be movable via, for example, a mouse, a trackpad, a touchscreen, a pointing stick, an optical imaging device, or some other input device capable of allowing a user to manipulate the context wheels. Each of context wheels 610A-C may be individually modifiable. However, a change to one context wheel may automatically modify another context wheel. For example, changing the location context wheel 610C from "Work" to "Home" may automatically change the mood context wheel 610A from "Productive" to "Fun." Additionally, changing the time context wheel 610B from "Now" to "Tonight" may similarly automatically change the mood context wheel 610A from "Productive" to "Fun." Modifications to the mood context wheel 610A may similarly automatically cause changes to the time and/or location context wheels 610B, C. In addition to explicit modifications of other context wheels, any change to one context wheel may also have an implicit effect on the activity assistant relative to other (perhaps unchanged) context wheels. For example, setting the location context wheel 610C to "Work" might cause slightly more productive activities to be ranked higher in the activity list 602 despite the mood context wheel 610A being set to "Fun." The implicit effects of location context wheel 610C could be even greater when mood context wheel 610A is set to a more general parameter, such as "Anything." Other types of implicit effects could be applied as well.

As shown in FIG. 6, the mood context wheel 610A is in the midst of being dragged downwards causing, e.g., the underlying "wheel" to rotate, and a new setting "Fun" to appear in the place of the previous setting "Productive." Assuming that "Fun" and "Productive" are the only two settings available for the mood context wheel 610A, and in one embodiment, dragging the mood context wheel 610A down again could cause the "Productive" setting to appear again and replace the "Fun" setting. Assuming a third option for mood context wheel 610A were available (e.g., "Outdoors"), the "Outdoors" setting would follow the "Fun" setting before the "Productive" setting would appear again. In another embodiment, a virtual "stop" may be imposed such that the user is prevented from scrolling past a "top" of the set of parameters available on the context wheel or past a "bottom" of the set of parameters available on the context wheel. In the example including the third "Outdoors" setting, the user would be prevented from scrolling the mood context wheel 610A past the "Outdoors" setting to reach the "Productive" setting again. Instead, the user would have to scroll in the opposite direction to reach the "Productive" setting again.

In response to the user's modification of the mood context wheel 610A to "Fun" in FIG. 6, a signal is sent to the activity assistant, which in response, may re-order and/or re-populate the activity list 602. For example, based on the state of the context panel 608 in FIG. 6, activity list 602 sets forth three examples of fun activities that are available near the user's work location and can be started now, including "Play Billiards at the Pool Hall," "Go Biking with Bike Club," and "See Baseball Game."

Figure 7:
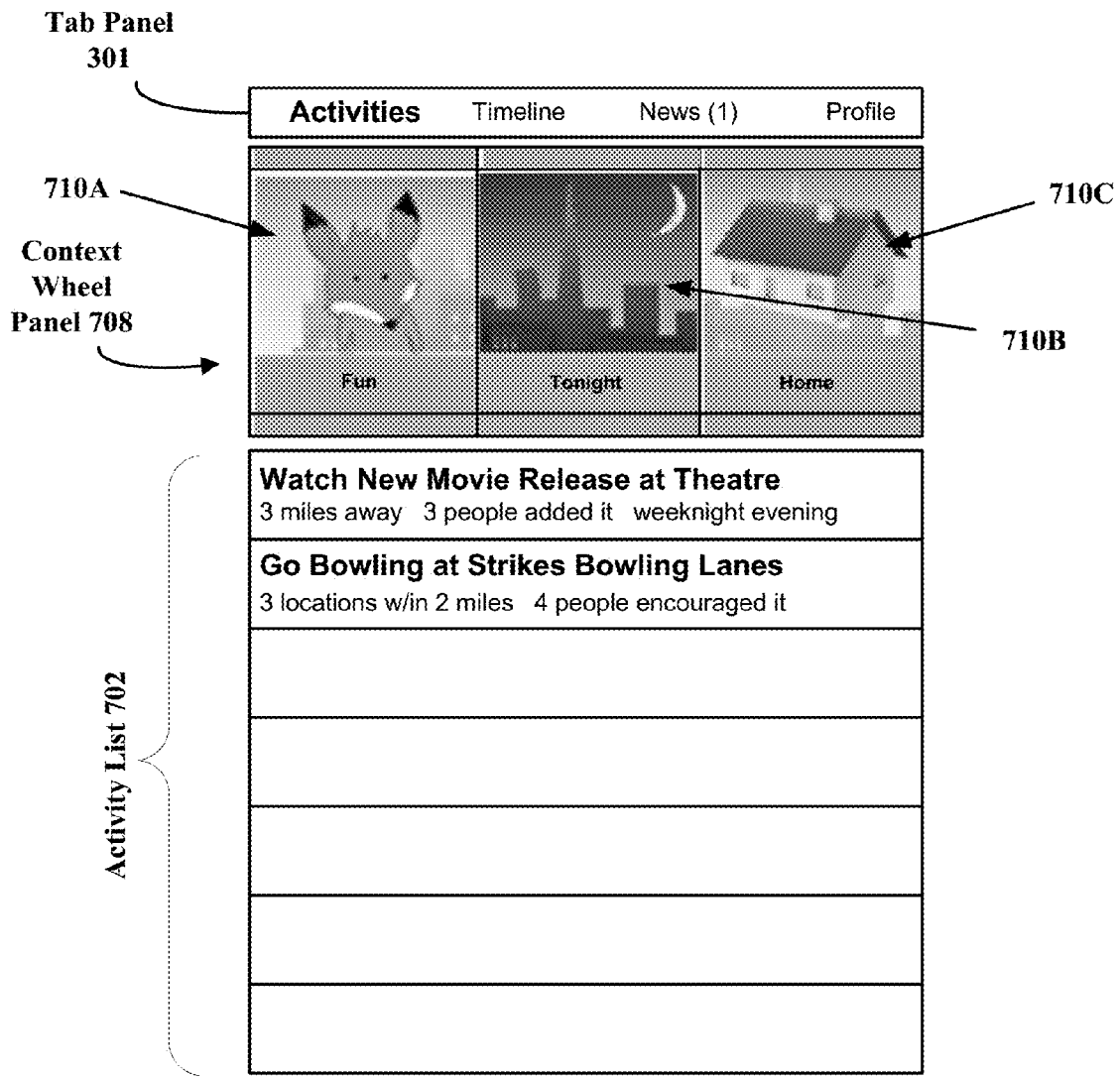
FIG. 7 is a block diagram further illustrating features of the alternative user interface of FIG. 5.

FIG. 7 illustrates a further example of modifications to context wheel panel 508, resulting in context panel 708. In the embodiment illustrated in FIG. 7, a user may have modified the time context wheel 710B from "Now" in FIG. 6 to "Tonight," as illustrated in FIG. 7. The user may have further modified the location context wheel 710C from "Work" in FIG. 6 to "Home" in FIG. 7. In at least one embodiment, the location context wheel 710C may have been automatically modified to "Home" in response to the user's modification of the time context wheel 710B from "Now" to "Tonight." Furthermore, and as illustrated in FIG. 7, changes to one context wheel may modify the appearance of other context wheels. For example, and as shown in FIG. 7, as a result of the time context wheel 710B being changed from "Now" to "Tonight," the other context wheels 710A and 710C may also be darkened to reflect the "night" impact of time context wheel 710B. In a further embodiment, for example, the house illustrated in the location context wheel 710C could be illustrated with its front-porch light turned on. Other types of changes could also be reflected across context wheels. For example, changing the mood context wheel 710A to "Sporty" might modify the location context wheel 710C to include, besides the house, a bike-rider riding on a sidewalk in front of the house. Other possibilities exist as well.

In any event, and in response to the modifications to context wheels 710B-C illustrated in FIG. 7, signals are sent to the activity assistant, which in response, may re-order and/or re-populate the activity list 702. For example, based on the state of the context panel 708 in FIG. 7, activity list 702 sets forth three examples of fun activities that are available near the user's home location and can be started tonight (e.g., perhaps between the hours of 5 pm and 10 pm), including "Watch New Movie Release at Theatre," and "Go Bowling at Strikes Bowling Lanes."

With respect to any or all of the block diagrams and flow charts in the figures as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or message may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

It should be understood that for situations in which the systems and methods discussed herein collect personal information about users, the users may be provided with an opportunity to opt in/out of programs or features that may collect personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of interfacing with an activity assistant processing system comprising:

providing for display a graphical interface comprising a plurality of selectable context elements, wherein each of the plurality of selectable context elements corresponds to at least one of a mood, a location, or a time during which to carry out at least one activity of a plurality of activities, wherein each of the plurality of selectable context elements is associated with one or more respective parameters;

selecting a first parameter associated with at least one selectable context element of the plurality of selectable context elements;

modifying, in response to the selected first parameter, an indicated parameter associated with at least one other selectable context element of the plurality of selectable context elements;

generating, in response to the selected first parameter and the modified indicated parameter, a first signal and providing the first signal to the activity assistant processing system;

receiving the plurality of activities populated and ordered based, at least in part, on the first signal; and providing for display the plurality of activities ordered based at least in part on the first signal.

2. The method of claim 1, further comprising:

selecting a second parameter and a third parameter, wherein each of the selected first parameter, the selected second parameter, and the selected third parameter is associated with a respective selectable context element of the plurality of selectable context elements.

3. The method of claim 1, wherein each of the selectable context elements includes an associated image.

4. The method of claim 1, wherein each of the selectable context elements includes a text label.

5. The method of claim 1, wherein each of the selectable context elements is enabled to receive user input for rotating each of the selectable context elements.

6. The method of claim 5, wherein rotating each of the selectable context elements cycles through the one or more respective parameters associated with the selectable context element.

7. The method of claim 6, wherein rotating each of the selectable context elements occurs in an upward or downward direction.

8. The method of claim 1, wherein the plurality of selectable context elements are arranged contiguously in the graphical interface.

9. The method of claim 8, wherein the plurality of selectable context elements are arranged contiguously as a single horizontal row in the graphical interface.

10. The method of claim 1, further comprising:

receiving user input for modifying a first selectable context element corresponding to the location;

modifying the first selectable context element responsive to the received user input; and modifying a second selectable context element corresponding to the mood responsive to the modified first selectable context element.

11. The method of claim 10, further comprising:

modifying a third selectable context element corresponding to the time during which to carry out the at least one activity of the plurality of activities responsive to the modified first selectable context element.

12. The method of claim 1, further comprising:

receiving user input for modifying a first selectable context element corresponding to the mood;

modifying the first selectable context element responsive to the received user input; and modifying a second selectable context element corresponding to the location responsive to the modified first selectable context element.

13. The method of claim 12, further comprising:
modifying a third selectable context element corresponding to the time during which to carry out the at least one activity of the plurality of activities responsive to the modified first selectable context element.

14. A system comprising:
memory;
one or more processors configured at least to:
provide a graphical interface comprising a plurality of selectable context elements, wherein each of the plurality of selectable context elements is associated with one or more respective parameters;
select a parameter associated with at least one selectable context element of the plurality of selectable context elements, wherein the parameter comprises at least one of a current mood of a user, a current location of the user, or a time during which the user desires to carry out an activity;
modify, in response to the selected parameter, an indicated parameter associated with at least one other selectable context element of the plurality of selectable context elements;
generate, in response to the selected parameter and the modified indicated parameter, a first signal and provide the first signal to an activity assistant processing system;
receive a plurality of activities populated and ordered based, at least in part, on the first signal; and
provide for display the plurality of activities ordered based at least in part on the first signal.

15. The system of claim 14, wherein the one or more processors are further configured to:
select at least three parameters, wherein the at least three parameters include the current mood of the user, the current location of the user, and the time during which the user desires to carry out at least one of the plurality of activities.

16. The system of claim 14, wherein each of the selectable context elements includes an associated image.

17. The system of claim 14, wherein each of the selectable context elements includes a text label.

18. The system of claim 14, wherein each of the selectable context elements is enabled to receive user input for rotating each of the selectable context elements.

19. An article of manufacture including a non-transitory computer-readable medium, having stored thereon program instructions that, upon execution by a computing device, cause the computing device to perform operations comprising:
providing a graphical interface comprising a plurality of selectable context elements, wherein each of the plurality of selectable context elements is associated with one or more respective parameters;
selecting at least three parameters respectively associated with at least three different selectable context elements, wherein the at least three parameters includes a mood of a user, a location of the user, and a time during which the user desires to carry out an activity;
modifying, in response to at least one parameter among the selected at least three parameters, an indicated parameter associated with at least one selectable context element among the at least three different selectable context elements, wherein the at least one parameter is associated with a selectable context element different from the at least one selectable context element;
generating, in response to the selected at least three parameters and the modified indicated parameter, first, second and third signals and providing the first, second and third signals to an activity assistant processing system;
receiving a plurality of activities populated and ordered based, at least in part, on the first, second and third signals; and
providing for display the plurality of activities ordered based at least in part on the first, second and third signals.

* * * * *